Patented July 5, 1949

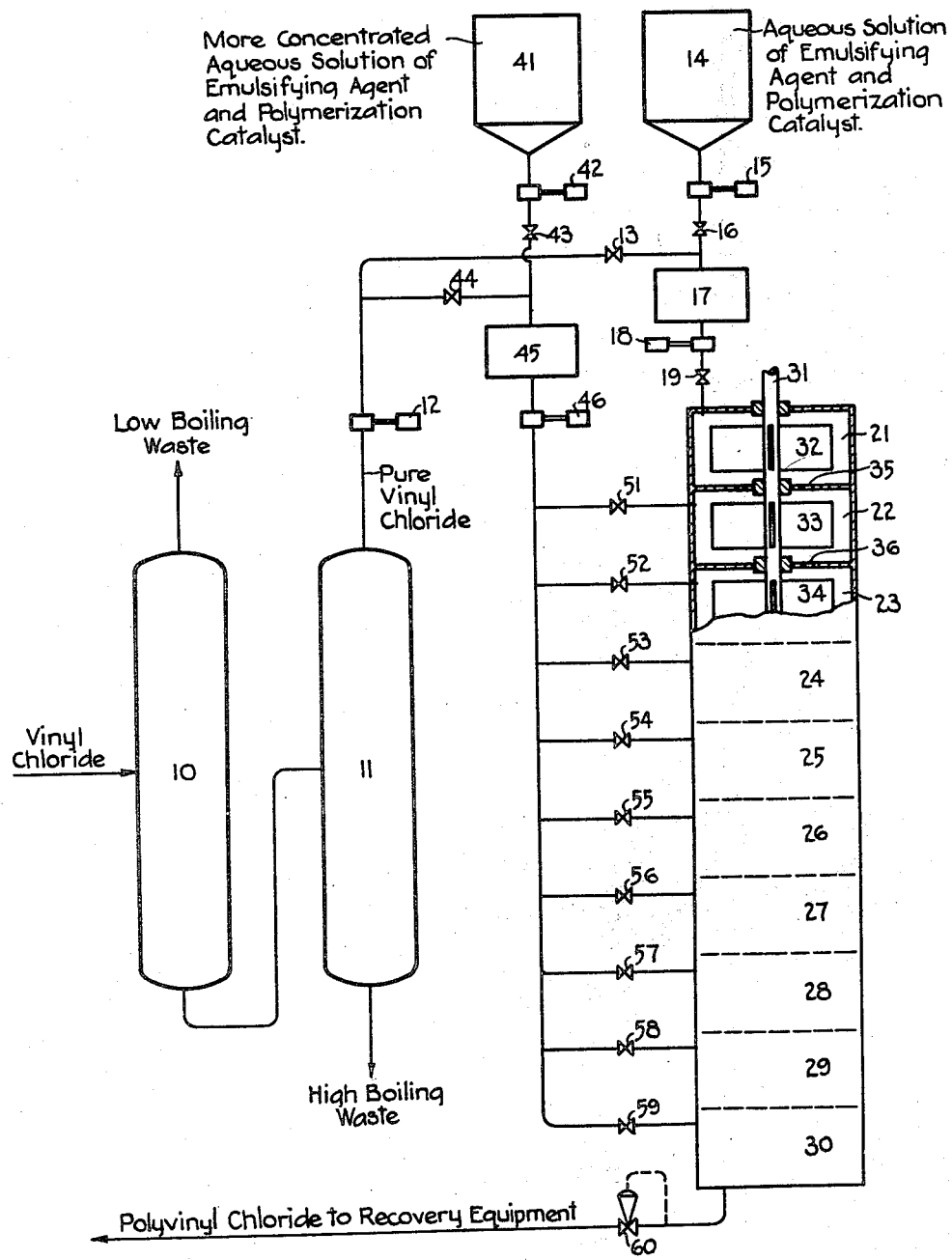

2,475,016

UNITED STATES PATENT OFFICE 2,475,016

EMULSION POLYMERIZATION OF VINYLIDENE COMPOUNDS

Willem Leendert Johannes de Nié, Amsterdam, Netherlands, assignor to Shell Development Company, San Francisco, Calif., a corporation of Delaware Application April 25, 1946, Serial No. 664,742
In the Netherlands May 2, 1945

8 Claims. (Cl. 260—83.7)

This invention relates to a process for effecting emulsion polymerization of vinylidene compounds in a continuous manner, i. e. continuous emulsion polymerization of compounds containing a

group. The invention pertains more particularly to a continuous method for producing polyvinyl chloride of very high and substantially molecular uniform weight by emulsion polymerization.

Vinyl chloride can be polymerized in aqueous emulsion by continuously feeding the emulsion which contains vinyl chloride into a reactor of elongated form and continuously discharging the polyvinyl chloride along with any unpolymerized vinyl chloride and the other emulsion ingredients at the other end of the reactor. If desired, several separate reactors can be connected in series and the emulsion which contains vinyl chloride produced in or fed to the first, with the polyvinyl chloride-containing material being discharged from the last. In this manner the vinyl chloride polymerizes in successive polymerization zones.

According to the process of the present invention, a stream of the aqueous emulsion of vinyl chloride is passed through a reaction apparatus and additional quantities of vinyl chloride are introduced at a plurality of successive points in the stream of emulsion. For example, the emulsion is continuously flowed through a series of successive reaction chambers which are separate but connected, and additional monomeric vinyl chloride is continuously introduced into those chambers which follow the first.

The advantages obtained from the method of the invention make it ideally suited for efficient production of polyvinyl chloride on a commercial scale. Furthermore, the results, besides being highly advantageous, are unpredictable. I discovered that the rate of polymerization is actually greater in the first chamber than when the polymerization is effected in a batchwise method wherein the emulsion ingredients including the monomer is introduced as a whole and then subjected to polymerizing conditions. Moreover, the polymerization rate in succeeding chambers may even surpass that in the first chamber. This is a surprising result for the reason that the induction period expected to be encountered in emulsion polymerization is eliminated. This induction period which is an appreciable interval between the time when the polymer-forming compound is brought into polymerizing conditions and that at which polymerization begins, is a cause of inefficiency for emulsion polymerization. It was therefore to be expected that addition of fresh monomer to the system would not result in immediate polymerization of this monomer and also that the fresh monomer would stop or seriously inhibit the rate of polymerization of conditioned monomer already in the system. It was found on the contrary that the addition of the fresh monomer actually resulted in a marked increase in the rate of polymerization so that the efficiency was appreciably increased. Thus, in the process of the invention wherein fresh monomer is introduced at a plurality of points in the stream of emulsion, wherein polymerization is occurring, not only is the induction period for this fresh monomer eliminated so that it polymerizes directly with maximum velocity under the reaction conditions, but also this maximum velocity is appreciably higher than that occurring under the same conditions without the addition of fresh monomer. Furthermore, the addition of the fresh monomer at successive points in the system also causes substantial increases in the rate of polymerization of unreacting monomer already present therein. This influence which is exercised is more marked as the weight ratio of the newly added monomer to the monomer already present in the polymerization system is greater.

An important result is realized from the increase in rate of polymerization in the process of the invention, which result is not possible in a practical sense by the other methods of emulsion polymerization. The very rapid rate of polymerization enables it to occur at reasonable velocities even though temperatures below about 30° C. are used, such as ordinary atmospheric temperatures of 20° C. to 25° C. Polymerization at such low temperatures is particularly advantageous because it is possible to obtain polymers which possess average degrees of polymerization that are much higher than those obtained at higher temperatures. These high average degrees of polymerization for the polyvinyl chloride produced by the process of the invention are not only to be attributed to the presence of polymer macromolecules having extremely high molecular weights, but also to the substantially complete absence of macromolecules of low molecular weights. This substantial absence of low molecular weight molecules in the products is due in part to the use of low polymerization temperatures, although the other methods of effecting the emulsion polymerization may in some cases be operated at such low temperatures, the rate of polymerization is so slow that they have no practical value for commercial production of the polymer. This fact may be illustrated more strikingly from the results given in the following table for otherwise comparable conditions using hydrogen peroxide as catalyst with the batchwise method, the continuous method without addition of monomer at subsequent points in the stream, and the method of the invention. The rate values are given in grams of polyvinyl chloride produced per liter of emulsion per hour.

| Polymerization Temperature | Batch-wise Method | Continuous Method | Method of Invention |
|---|---|---|---|
| 50° C | 80 | | |
| 40° C | 30 | | |
| 35° C | 10 | | |
| 30° C | | 10 | |
| 20° C | | | 50 |

No attempt was made to extend the operation in the batchwise method to 30° C. or lower since the foregoing results clearly demonstrate that it will be about zero, or in other words, that the polymerization will practically stop at this temperature. Even with the continuous method not using addition of fresh vinyl chloride at a plurality of points, the rate is so slow that the production of polymer by the method is not practicable at the low temperature of 30° C.

Polymerization by the aforedescribed batchwise or non-addition, continuous methods at temperatures where even a reasonable rate of polymerization occurs, gives a polymer having a broad distribution of molecules ranging from very low molecular weight to high molecular weight. Although there may be a small proportion of high molecular weight molecules in this polymer, there is associated therewith so much material of low molecular weight that the average degree of polymerization for the polymer as measured by the usual viscosity methods is not very high. Moreover, the very appreciable proportion of the low molecular weight material results in a polymer lacking in desirable properties for polyvinyl chloride such as rubberiness and elasticity. In contrast, the polymer produced by the method of the invention has a very narrow distribution with a large proportion of high molecular weight material and substantially no very low molecular weight material.

In emulsion polymerization, the polymer is apparently formed by two mechanisms which occur simultaneously. The high molecular weight molecules of the polymer seem to be formed near or at the interface of the emulsion and this polymer has a high degree of polymerization. The undesirable low molecular weight polymer is formed from monomer normally dissolved in the aqueous phase of the emulsion, and its formation unavoidably occurs in the other methods of emulsion polymerization than that of the invention. When the emulsion polymerization is effected at below 30° C. in accordance with the method of the invention, the rate of polymerization of the monomer normally dissolved in the aqueous phase appears to be immeasurably slow so that the polymer obtained has a very high degree of polymerization and there is practically an absence of low molecular weight therein.

While certain theories have been advanced to to explain some of the unexpected results of the process of the invention, it is evident they are built on afterthoughts of unobvious facts which were discovered from operation of the process. The theories make the invention more understandable, but it is to be unequivocally understood that the invention is not limited by the correctness of these theories.

The accompanying drawing diagrammatically illustrates one form of apparatus for carrying out the process of the invention.

Vinyl chloride is fed to fractionating columns 10 and 11 for removal of low boiling and high boiling waste so as to obtain sharply fractionated, pure vinyl chloride. It was found that markedly better results are obtained when freshly distilled vinyl chloride is employed rather than using vinyl chloride that has been stored for an appreciable time, even though pure. Accordingly, immediately after being distilled and purified, the vinyl chloride is fed to pressure pump 12 and conveyed in liquid form through valve 13. Aqueous solution of emulsifying agent and polymerization catalyst is fed from tank 14 to pump 15 through valve 16 after which the aqueous solution joins the liquid vinyl chloride from valve 13 and is emulsified in mixer 17. The mixture is passed by pump 18 through regulating valve 19 into the first reaction chamber 21. Ten reaction chambers, namely, chambers 21 to 30 are connected in series in such a manner that common shaft 31 can provide the rotating power for paddle wheels contained in each chamber for mixing to provide sufficient agitation to maintain a substantially uniform emulsion, of which paddle wheels 32, 33 and 34 are shown in the sectionalized view. Each reaction chamber is a reaction zone separate from the other except for small connecting openings like passages 35 and 36 as shown. Each chamber is fitted with a coil (not shown) to provide heating or cooling as needed by circulation of a medium therethrough like steam or cold water for temperature control in the reaction chambers. The desired emulsion is fed from valve 19 into first chamber 21 and polymerization begins there. The emulsion is then passed continuously through the succeeding chambers and the rate of polymerization is markedly increased by feeding additional monomeric vinyl chloride into these succeeding chambers. This is done preferably as an emulsion with a concentrated aqueous solution of the emulsifying agent. The solution may contain polymerization catalyst, if desired, or it can all be fed in with the initial emulsion. The aqueous solution containing larger proportions of emulsifying agent, and polymerization catalyst when used, is fed from tank 41 to pump 42 then through valve 43 where it joins freshly distilled monomeric vinyl chloride which has passed through valve 44. The material is emulsified in mixer 45 and is then fed by pump 46 to the reaction chambers other than the first so that it passes through regulating valve 51 into reaction chamber 22, through regulating valve 52 into reaction chamber 23, etc. In this manner, the emulsified mixture of fresh monomeric vinyl chloride is fed into as many of the reaction chambers as desired by use of regulating valves 51 to 59, preferably into each. The vinyl chloride already present in the reaction chamber polymerizes at a rapid rate along with that newly added and the emulsion finally passes through last chamber 30 from which the polyvinyl chloride still in its emulsified form is withdrawn through pressure regulated valve 60 which maintains the pressure on the reaction system sufficiently high so that the materials therein are in liquid phase.

The product is passed to recovery equipment (not shown) where any unpolymerized vinyl chloride is separated by flashing, and the polymer is coagulated, filtered and dried in the usual fashion well known to those skilled in the art.

While the foregoing has described execution of the process in a single unitary reaction vessel containing separate but connected reaction zones, it is apparent that the invention can be effected with other apparatus. For example, a series of separate reaction vessels equipped with individual stirrers can be used. The vessels are connected together so the emulsion flows from one to the next in series and additional monomer is introduced into one or more, preferably all but the first. Such separate vessels are preferably fitted with baffles between separate stirrers therein so as to aid in preventing "short circuiting" of the added monomer.

For purposes of simplicity in understanding the invention, the process has been described with particular emphasis to polymerization of vinyl chloride in aqueous emulsion. However, the process may be applied to emulsion polymerization of any polymerizable vinylidene compound, i. e. a compound containing the group

$$CH_2=C\diagup\diagdown$$

with which addition polymerization occurs by carbon-to-carbon bonding between olefinic carbon atoms. A vinylidene compound of 2 to 14 carbon atoms may be used. Thus, there can be employed besides vinyl halides like vinyl chloride or bromide, such representative compounds as vinyl acetate, propionate, and butyrate; vinylidene chloride and bromide; styrene, methyl styrene and chlorostyrene; methyl, ethyl and butyl acrylates and methacrylate; allyl and methylallyl acetate and butyrate; acrylonitrile and methacrylonitrile; isobutylene and isoamylene; methyl vinyl and methyl isopropenyl ketone; and like singly olefinic compounds together with their homologues. Also suitable are vinylidene compounds which contain a plurality of olefinic linkages between aliphatic carbon atoms that are adapted to enable formation of addition polymers as is the case with such typical compounds as butadiene-1,3, isoprene, 2,3-dimethyl butadiene-1,3, chloroprene, divinyl benzene, 2-methyl pentadiene-2,4, 2-methyl pentadiene-1,3 ethylene glycol dimethacrylate, diallyl phthalate, diallyl diglycolate, allyl vinyl phthalate, diallyl maleate, diallyl ether of ethylene glycol, triallyl ether of glycerol, and similar compounds as well as their homologues. Copolymers can be prepared by interpolymerizing mixtures of one or more of the vinylidene compounds, the mixture containing at least an appreciable proportion of any one compound such as one or more per cent of it. For example, vinyl chloride can be copolymerized with 5% to 25% of vinyl acetate, and if desired, 1% to 5% of divinyl benzene can be present as third constituent. Appreciable quantities of isoprene can be copolymerized with chloroprene. Likewise, butadiene-1,3 can be mixed with 5% to 50% of acrylonitrile or styrene and interpolymerized with the mixture effected in the process of the invention. It has been found that particularly efficient results and excellent copolymers are produced by initially charging to the process a mixture of compounds predominating in the slower polymerizing compound and then adding a mixture containing a larger proportion of the faster polymerizing compound at subsequent points in the stream of flow in the process. For example, a copolymer of vinyl chloride and vinylidene chloride is prepared by subjecting to polymerizing conditions in the initial feed a mixture of vinyl chloride and vinylidene chloride, the former predominating in the mixture, e. g. 60% to 90% and admitting a mixture with larger proportion of the faster polymerizing vinylidene chloride, e. g. 40% to 60% to subsequent reaction zones in the series employed in the flow. The particular ratios will depend upon the particular composition desired in the copolymer. In all cases, whether in production of homopolymers or copolymers, the method of the invention gives products having a high degree of polymerization although this will vary to considerable extent depending upon the particular vinylidene compound or compounds employed and the polymerizing conditions. Degrees of polymerization as low as 10 are exceptional in the process and usually they are 50 or higher with 1000 to 2000 being readily effected in many cases with easily polymerizable compounds such as vinyl chloride.

The aqueous phase employed to effect the emulsion polymerization in the process of the invention is made up with the emulsifying agent therein. Various emulsifying agents are suitable such as soaps like sodium and/or potassium, myristate, laurate, palmitate, oleate, stearate, rosinate and/or hydroabietate; or alkali metal alkyl or alkylene sulfates or sulfonates such as sodium and/or potassium lauryl sulfate, cetyl sulfate, oleyl sulfonate, stearyl sulfonate, sulfonated Turkey red oil, sulfonated mineral oils, etc., as well as ammonium salts thereof; or salts or higher amines like lauryl amine hydrochloride, or stearyl amine hydrobromide. Ordinarily about 2% to 5% of the emulsifying agent or mixtures thereof in the aqueous phase is suitable. In many cases it is desirable to work with an acidic emulsion such as one having a pH in the range of 1 to 6. This is attained by the use of proper emulsifying agents which function effectively in acid medium such as sodium alkyl sulfates or amine salts like lauryl amine hydrochloride and by adjusting the pH by addition of a strong mineral acid such as hydrochloric, or nitric. In some cases small changes in the pH of the reacting medium will have marked effect on the rate of polymerization. Thus, in polymerization of vinyl chloride in the process of the invention, there is an appreciable decrease in the rate of polymerization on increasing the pH from 2.5–2.6 to 3.2–3.3, indicating that maximum rates are obtained by use of a somewhat more acid reaction medium such as below about 3.

An oxygen-yielding catalyst is employed to effect the desired polymerization. Preferably the catalyst is water-soluble as is the case with hydrogen peroxide, sodium or potassium persulfate, percarbonate and perborate, peracetic acid and tertiary butyl hydroperoxide, although other catalysts can be used like benzoyl peroxide, acetyl peroxide, lauryl peroxide, acetone peroxide, etc. About 0.1 to 5% catalyst in the reaction medium is suitable.

The temperature of operation in the process of the invention will vary over considerable limits depending, for best results, to considerable extent, on the particular vinylidene compound or compounds being polymerized. Thus the temperature limits may be as low as 15° C. and in extreme cases as high as about 150° C. Ordinary temperatures from about 20° C. to 80° C. are employed. Sufficient pressure is of course applied to the reaction mixture to maintain the constituents in liquid phase. Ordinarily it is preferred to operate the successive reaction zones at approximately the same temperature. Although exceptionally good results are obtained in polymerizing at 15° C. to 30° C., as explained hereinbefore because there is obtained thereby the very high degree of polymerization with narrow distribution of molecular weight ranges for the polymer, the effect of the desired narrow distribution is also realized at higher temperatures. This effect is very desirable but unexplainable in view of the contrasting results obtained when polymerization is effected batchwise or upon continuous addition of monomer at only the start of the reaction zone. This narrow distribution and substantial lack of undesired low molecular weight material makes the polymer very attractive since it could only be obtained in the other methods than that of the process of the invention by laborious and difficult fractionation of the polymer, wherein the low molecular weight material must be discarded and wasted.

In executing the process of the invention, the method is preferably carried out so the substance to be polymerized in aqueous emulsion is conducted through a series of distinct reaction zones like separated but connected reaction chambers. The flow in the method is such that it continuously advances from chamber to successive chamber without appreciable, or preferably no, back flow. The number of reaction zones in series is preferably at least four and may be as many as twenty or even higher. Additional monomer is continuously introduced at one or more of the reaction zones other than the first. The polymerization of monomer in any single reaction zone need not be complete since monomer transferred as such to subsequent zones will be polymerized there. The fresh monomer is preferably introduced in the form of aqueous emulsion at the subsequent points in the stream. For this purpose more concentrated emulsion is used. The initial feed tank system can contain about 5% to 20% of monomer in the aqueous emulsion and the emulsion added subsequently to the stream of flow will be more concentrated both with respect to the monomer, e. g. 20% to 50%, and with respect to emulsified agent, and catalyst when used therein, which may have a concentration of double that of the aqueous material. Also for best results the proportion of fresh monomer pumped in at subsequent points in the stream of flow is from one-quarter to one-half the quantity of monomer introduced into the first reaction zone. It is most important that the added aqueous phase or emulsion does not appreciably disturb the pH of the emulsion already in the reaction zone. In other words, the pH of the stream where the emulsion is occurring is maintained substantially constant by addition of material having the pH thereof suitably adjusted. Otherwise the maximum effect of the high rate of polymerization may not be so completely realized.

For the purpose of illustrating the invention in greater detail as well as comparing results with those obtained where no additional monomer was added to the stream of flow the following example is given.

*Example I*

The polymerization was effected in a reaction vessel similar to that shown in the accompanying drawing. It was a vessel of V2A steel having a length of about 2 meters and contents about 100 liters which was divided by partitions into compartments of about 10 liters each. Every compartment was provided with a stirrer providing sufficient agitation to maintain good mixing which was driven by a common shaft and a steel tube through which hot or cold water could be passed so as to regulate the temperature in each compartment, the temperature being read off a thermometer fitted in each reaction zone. The communication between the compartments was formed by small annular openings in the partitions.

There was pumped into the first chamber of this reaction vessel during each hour at continuous rate an emulsion which consisted of 1.5 kg. of freshly distilled and sharply fractionated vinyl chloride and 12.75 kg. of a solution containing 1.5% by weight of sodium cetyl sulfate and 0.2% of hydrogen peroxide the solution having been acidified with nitric acid to a pH of 2.9.

Into the second chamber there was pumped at uniform rate 2.25 kg. of an emulsion during each hour which consisted of 0.75 kg. of freshly distilled, pure vinyl chloride and 1.5 kg. of aqueous phase which was more concentrated in containing 2.25% of the emulsified agent and 0.3% of the hydrogen peroxide.

Into each of chambers 3, 4 and 5 there was pumped during each hour at a regular rate, 1.5 kg. of the emulsion described above for chamber 2.

The polymer suspension left the reaction vessel, after having passed through the last chamber, by means of a pressure valve adjusted in such a manner that the pressure in the reaction vessel was always higher than the saturation pressure of vinyl chloride at the reaction temperature which was about 23° C. The pressure was about 3 atmospheres. After pumping in the reaction components for a time sufficient to reach a steady state, the polymer concentration and the monomer concentration in all chambers was determined by withdrawing samples and making an analysis. From the results thereof the rate of polymerization in each of the reaction chambers was determined. The rate is expressed in the following table as grams of polymer per liter of emulsion per hour.

| Chamber | Addition of Fresh Monomer | Rate of Polymerization |
|---|---|---|
| 1 |  | 35 |
| 2 | yes | 60 |
| 3 | do | 50 |
| 4 | do | 50 |
| 5 | do | 40 |
| 6 | no | 25 |
| 7 | do | 10 |
| 8 | do | 5 |
| 9 | do | 3 |
| 10 | do | 3 |

The foregoing results clearly demonstrate the marked improvement which is realized by the method of the invention. In chambers 2 to 5, into each of which was fed additional monomeric vinyl chloride, the rate of polymer formation was markedly higher than in the first chamber. Furthermore, the reaction system was operated so that the last five chambers, namely, chambers 6 to 10, had no additional monomer added thereto. Thus, chambers 6 to 10 corresponded at least approximately to a reaction system involving a series of separate reactors wherein monomer was fed to only the first. As will be noted from the results, the rate of polymerization in chambers 6 to 10 is slow as compared to that in the first part of the system employing the method of the invention. For example, the rate of polymerization in chamber 9 or 10 is only about 1/20 of that in chamber 2.

As pointed out before, the method of the invention gives the desirable polymers having very high molecular weights. Since true or absolute values of molecular weights for such high polymers cannot be determined with certainty, I prefer to speak of this matter in terms of the Staudinger viscosity number $Z\eta$. Such values can be obtained according to the method published by H. Staudinger, Z. Elektrochem. 49, 7–16 (1943). They are strictly comparable with respect to the molecular weights of the polymers. The values herein reported were determined at 25° C. using methylcyclohexanone as the solvent at 5% polymer concentration.

The polymer obtained in the example had a high average degree of polymerization, the value of $Z\eta$ being about $130 \times 10^{-3}$. Even though the reaction system was not operated according to the procedure of the invention in its entirety, this value is in marked contrast to that obtained when emulsion polymerization of vinyl chloride was effected in a series of reaction vessels at about 30° C. with monomeric vinyl chloride being fed only to the first. In that case the polymer had a $Z\eta$ value of about $80 \times 10^{-3}$ and contained an appreciable quantity of fractions with a low degree of polymerization. The method of the invention easily gives polyvinyl chloride having $Z\eta$ values above about $100 \times 10^{-3}$ such as $130 \times 10^{-3}$ to $140 \times 10^{-3}$, and in cases with polymerization at about 20° C., polymers having values of about $160 \times 10^{-3}$ to $170 \times 10^{-3}$ can be produced.

As described before, water-soluble persalts can be used as catalysts in place of peroxides. When such water-soluble persalts are used in combination with water-soluble substances capable of absorbing molecular oxygen, the rate of polymerization obtained in the method of the invention is even faster than when peroxides are employed as catalysts. Thus, there can be used in the aqueous phase about 0.1% to 5% of such salts as ammonium, sodium or potassium persulfate, perborate or percarbonate, and about the same quantity of water-soluble oxygen absorbers such as sodium or potassium sulfites and hydrosulfites like potassium meta-bisulfite; hydroxylamine or hydrazine as well as the hydrochloride and hydrobromide salts thereof; thioglycolic acid and its sodium or potassium salts, etc.

The use of such substances which are capable of promoting polymer formation is illustrated in the following example:

*Example II*

The polymerization apparatus consisted of five autoclaves connected in series, each of which was fitted with a stirrer and had a capacity of about 2 liters. There was pumped into the first autoclave during each hour about 15.6 kg. of an aqueous phase containing 2.5% of sodium cetyl sulfate, 0.2% of potassium persulfate, and 0.4% of sodium sulfite, the aqueous phase having been adjusted to a pH of 2.5 by addition thereto of hydrochloric acid. Before this aqueous mixture was admitted to the first autoclave it was passed through a centrifugal pump along with freshly distilled vinyl chloride in amount of 2 kg. per hour so that the vinyl chloride in form of aqueous emulsion was passed to the first autoclave. The emulsion was led successively and continuously from the first autoclave to the second and so on through the series.

Into the second, third and fourth autoclaves, an emulsion of fresh vinyl chloride was introduced. The emulsion consisted of one part by weight of vinyl chloride and two parts of an aqueous solution containing no persulfate, but 0.2% of sodium sulfite, which solution had a pH of 2.5 by addition of hydrochloric acid. This emulsion was pumped into the second, third and fourth autoclaves at such a rate that 0.67 kg. of vinyl chloride was added per hour.

A temperature of about 23° C. was employed under the polymerizing conditions, and it was found that the average rate of polymerization amounted to more than 400 g. of polyvinyl chloride per liter of emulsion per hour.

The use of the same catalyst combination under otherwise similar conditions except that no additional vinyl chloride was added to the reactors following the first gave a polymerization velocity of only about 100 g. of polymer per liter of emulsion per hour.

The following example is given for the purpose of illustrating application of the method of the invention to manufacture of copolymers.

*Example III*

The same polymerization apparatus as described in Example II was employed. The equeous phase of the emulsion fed to the first reactor contained 2.5% sodium cetyl sulfate, 0.2% potassium persulfate and 0.4% of sodium sulfite, and was acidified to a pH of 2.5 with hydrochloric acid. The emulsion was formed with the aid of a centrifugal pump so that there was fed each hour about 16 kg. of the water phase and 1.6 kg. of a mixture containing 80% by weight of vinyl chloride and 20% by weight of vinylidene chloride.

In the second, third and fourth autoclaves an emulsion was added per hour consisting of 1.6 kg. of a 2.5% solution of sodium cetyl sulfate and 0.2% of sodium sulfite acidified with hydrochloric acid to a pH of 2.5, and 0.8 kg. of a mixture of equal parts by weight of vinyl chloride and vinylidene chloride. The polymerization was effected at about 20° C. and under these conditions the rate of polymerization amounted to about 380 g. of copolymer per liter of emulsion per hour. The copolymer which was formed contained about equal weights of vinyl chloride and vinylidene chloride.

When the same reaction conditions were employed except that monomer was supplied only to the first reactor, the rate of polymerization amounted to only about 40 g. of copolymer per liter of emulsion per hour.

I claim as my invention:

1. A method for effecting emulsion polymerization of vinylidene compounds which comprises continuously feeding an aqueous emulsion of the vinylidene compound through a series of reaction zones up to twenty in number under polymer-forming conditions and continuously feeding a substantial amount of additional vinylidene compound into at least one of the reaction zones following the first.

2. A method for effecting emulsion polymerization of vinylidene compounds which comprises continuously introducing an aqueous emulsion of the vinylidene compound of 2 to 14 carbon atoms into the first of a plurality of reaction zones up to twenty in number operating under polymerizing conditions which are connected in series and continuously feeding a substantial amount of additional monomeric vinylidene compound into the reaction zones following the first.

3. A method for effecting emulsion polymerization of vinylidene compounds which comprises continuously introducing an aqueous emulsion of the vinylidene compound of 2 to 14 carbon atoms into the first of from four to twenty reaction zones connected in series which are maintained under polymer-forming conditions while continuously feeding a substantial amount of additional vinylidene compound in the form of an aqueous emulsion into the reaction zones following the first.

4. A process for effecting emulsion polymerization of vinyl chloride which comprises continuously introducing an aqueous emulsion of vinyl chloride into an elongated reaction zone under polymerizing conditions and introducing a substantial amount of additional vinyl chloride at a plurality of successive points up to twenty in number in the stream of flow following the first point of introduction.

5. A process for effecting emulsion polymerization of vinyl chloride which comprises continuously introducing an aqueous emulsion of vinyl chloride into a series of connected reaction zones up to twenty in number kept at polymerizing conditions and continuously introducing a substantial amount of additional vinyl chloride into the reaction zones following the first, the reaction zones being maintained at a temperature between about 15° C. and 30° C.

6. A process for effecting emulsion polymerization of vinyl chloride which comprises continuously introducing an aqueous emulsion of vinyl chloride containing an emulsifying agent, a persulfate polymerization catalyst and an agent reactive with molecular oxygen under the reaction conditions into the first of a series of reaction zones of from four to twenty in number through which the emulsion is passed under polymer-forming conditions and continuously introducing from one-quarter to one-half additional proportions of vinyl chloride into at least one reaction zone following the first along with aqueous phase containing emulsifying agent and the agent reactive with molecular oxygen, the emulsion in the reaction zones being maintained at a pH between about 1 and 3 and at a temperature between about 15° C. and 30° C.

7. A process for effecting emulsion copolymerization of butadiene-1,3 and styrene which comprises continuously introducing an aqueous emulsion of butadiene-1,3 into the first of a plurality of reaction zones up to twenty in number connected in series wherein polymerizing conditions are maintained and continuously introducing a substantial amount of additional butadiene-1,3 and styrene into at least one reaction zone following the first.

8. A method for effecting emulsion copolymerization of vinyl chloride and vinylidene chloride which comprises continuously introducing an aqueous emulsion of vinyl chloride and vinylidene chloride into the first of a plurality of reaction zones up to twenty in number connected in series which are maintained under polymer-forming conditions while continuously feeding a substantial amount of additional vinyl chloride and vinylidene chloride in the form of an aqueous emulsion into reaction zones following the first.

WILLEM LEENDERT JOHANNES DE NIÉ.

REFERENCES CITED

The following references are of record in the file of this patent:

UNITED STATES PATENTS

| Number | Name | Date |
| --- | --- | --- |
| 2,068,424 | Mark | Jan. 19, 1937 |
| 2,259,180 | Schoenfeld | Oct. 14, 1941 |
| 2,345,659 | Downes | Apr. 4, 1944 |
| 2,363,951 | Fikentscher | Nov. 28, 1944 |
| 2,394,291 | Calcott | Feb. 5, 1946 |